United States Patent

Beigel

[11] Patent Number: 5,973,598
[45] Date of Patent: Oct. 26, 1999

[54] RADIO FREQUENCY IDENTIFICATION TAG ON FLEXIBLE SUBSTRATE

[75] Inventor: Michael L. Beigel, Corona, Calif.

[73] Assignee: Precision Dynamics Corporation, San Fernando, Calif.

[21] Appl. No.: 09/150,130

[22] Filed: Sep. 9, 1998

Related U.S. Application Data

[60] Provisional application No. 60/058,518, Sep. 11, 1997.

[51] Int. Cl.[6] .................................................. G08B 13/187
[52] U.S. Cl. ........................ 340/572.1; 29/595; 29/846; 29/DIG. 40; 340/572.5; 340/572.9
[58] Field of Search ........................... 340/572.5, 572.1, 340/572.9; 29/595, 846, DIG. 40

[56] References Cited

U.S. PATENT DOCUMENTS

| | | | |
|---|---|---|---|
| 4,333,072 | 6/1982 | Beigel | 340/572.1 |
| 4,682,415 | 7/1987 | Adell | 29/846 |
| 4,973,944 | 11/1990 | Maletta | 340/572.9 |
| 5,115,223 | 5/1992 | Moody | 340/572.9 |
| 5,493,805 | 2/1996 | Penuela et al. | 40/633 |
| 5,609,716 | 3/1997 | Mosher, Jr. | 156/522 |
| 5,615,504 | 4/1997 | Peterson et al. | 40/633 |
| 5,646,592 | 7/1997 | Tuttle | 340/572.1 |
| 5,781,110 | 7/1998 | Habeger, Jr. et al. | 340/572.1 |

Primary Examiner—Glen Swann
Attorney, Agent, or Firm—Thomas P. Mahoney

[57] ABSTRACT

An enhanced identification tag produces an identification (ID) signal, i.e., a radio frequency (RF) signal carrying identification information, capable of being interpreted by an electronic reader device. An identification tag in accordance with the invention is characterized by a flexible substrate, programmable encoder circuitry formed on said substrate defining identification information, an antenna, and signal generator circuitry carried by said substrate responsive to said encoder circuitry for applying a radio frequency signal bearing said identification information to said antenna. A preferred tag is fabricated using a printing process to mark a conductive pattern, e.g., comprised of a conductive ink based on silver, carbon, etc., on a flexible substrate, e.g., polyethyline, polyvinyl chloride or other plastic type material. In a typical application, the flexible substrate is then preferably used to form a wrist band that can be used to identify an individual to permit, deny or otherwise determine the level of access to an area, e.g., a concert, a work area or other restricted environment.

20 Claims, 5 Drawing Sheets

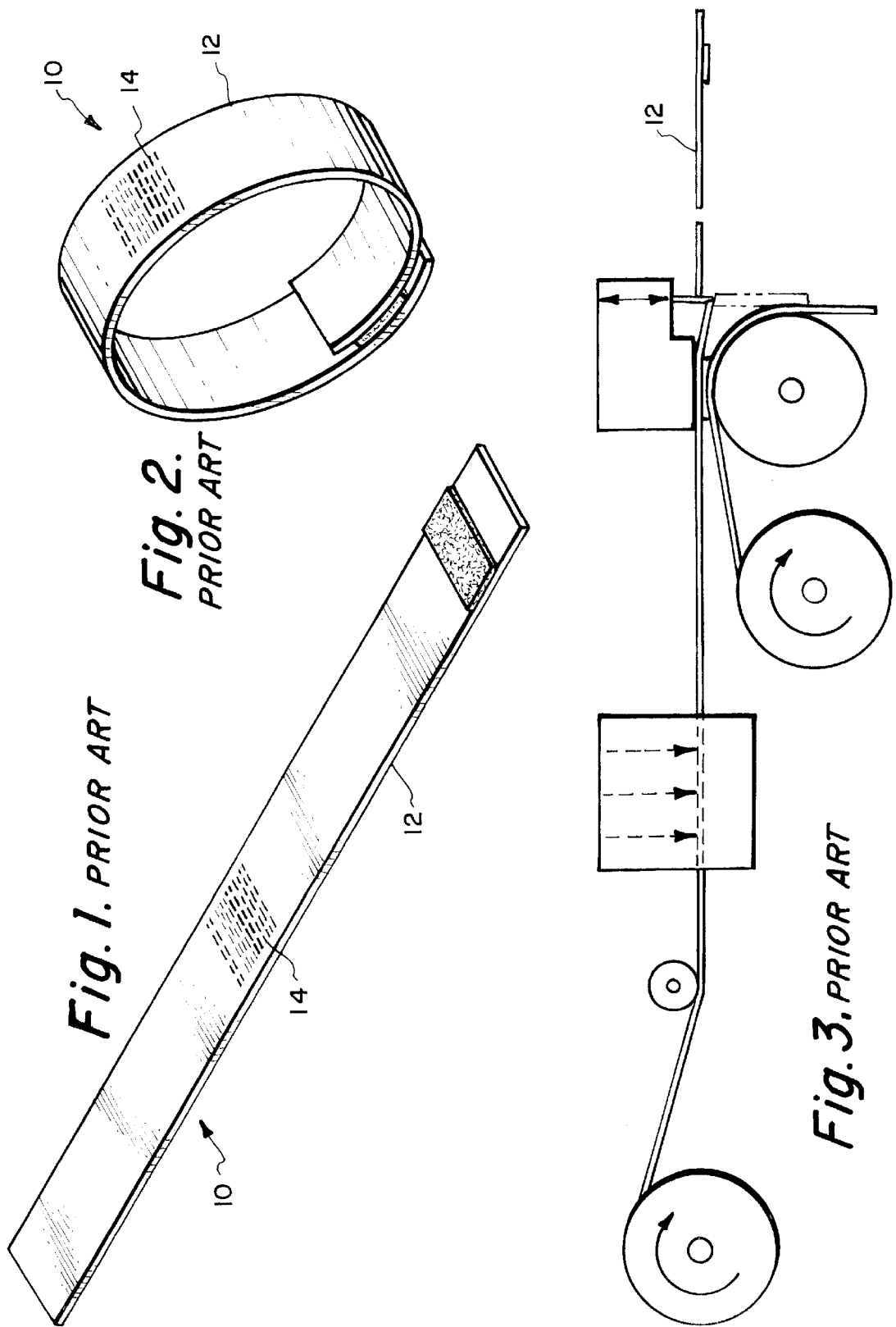

RADIO FREQUENCY IDENTIFICATION TAG ON FLEXIBLE SUBSTRATE

This application claims the benefit of U.S. Provisional Application No. 60/058,518, filed Sep. 11, 1997.

This invention relates to identification systems and tags therefor for producing a radio frequency identification signal capable of being interpreted by an electronic reader device.

BACKGROUND OF THE INVENTION

Commonly known identification systems use a reader device which emits an interrogation signal such that a proximate identification tag returns an identification signal to the reader. Known types of identification tags include passive non-electronic, e.g., bar coded, tags which are visually identified by the reader according to an imprinted pattern. Such tags and systems for manufacturing such tags via an essentially continuous process have been disclosed in U.S. Pat. No. 5,615,504 to Peterson et al. and U.S. Pat. No. 5,609,716 to Mosher, Jr., both of which are assigned to the assignee of the present invention. Such systems require that the bar code be visible, i.e., within the line-of-sight of the reader.

RFID (radio frequency identification) tags are also well known which respond to a radio frequency transmission from a reader to cause the tag to return an electronic signal to the reader. For example, U.S. Pat. No. 5,493,805 to Penuela shows a flexible wrist band mounting a memory chip or tag which can be accessed via a radio frequency signal and U.S. Pat. No. 4,333,072 to Beigel shows exemplary circuitry for an RFID tag.

SUMMARY OF THE INVENTION

The present invention is directed to an enhanced identification tag for producing an identification (ID) signal, i.e., a radio frequency (RF) signal carrying identification information, capable of being interpreted by an electronic reader device, spaced from, but in the vicinity of, e.g., one to twelve feet, the tag. An identification tag in accordance with the invention is characterized by a flexible substrate, programmable encoder circuitry formed on said substrate defining identification information, an antenna, and signal generator circuitry carried by said substrate responsive to said encoder circuitry for applying a radio frequency signal bearing said identification information to said antenna.

In accordance with one aspect of the invention, the programmable encoder circuitry is comprised of conductive paths selectively formed on the substrate, e.g., by conductive ink printing, metal deposition, or other techniques suitable for continuous line manufacturing.

In accordance with a different aspect of the invention, the signal generator circuitry includes one or more electronic switches and/or amplifier devices, e.g., field effect transistors (FETs), formed on said substrate by printing or analogous techniques suitable for continuous line manufacturing.

In accordance with a further aspect of the invention, the signal generator circuitry includes one or more reactance (inductance and/or capacitance) elements formed on said substrate by printing or analogous techniques suitable for continuous line manufacturing.

An identification tag in accordance with the invention can be triggered to transmit its ID signal in various manners and is thus suitable for use in multiple types of identification systems. For example, the system can use an interrogator-reader device which generates an interrogation signal to cause the tag to return an ID signal. Alternatively, the tag can be configured to transmit its ID signal in response to some other event such as the end of a timed interval.

The novel features of the invention are set forth with particularity in the appended claims. The invention will be best understood from the following description when read in conjunction with the accompanying drawings.

BRIEF DESCRIPTION OF THE DRAWINGS

FIGS. 1 and 2 show an exemplary prior art identification device comprising a wrist band having bar-coded identification information imprinted thereon;

FIG. 3 is a schematic representation of a prior art continuous line manufacturing process for fabricating the identification device of FIGS. 1 and 2;

DESCRIPTION OF THE PREFERRED EMBODIMENTS

The present invention is directed to an enhanced identification tag for producing an identification (ID) signal, i.e., a radio frequency (RF) signal carrying identification information, capable of being interpreted by an electronic reader device. An identification tag in accordance with the invention is characterized by a flexible substrate, programmable encoder circuitry formed on said substrate defining identification information, an antenna, and signal generator circuitry carried by said substrate responsive to said encoder circuitry for applying a radio frequency signal bearing said identification information to said antenna.

A tag in accordance with the invention is preferably fabricated using continuous line manufacturing techniques, e.g., printing, to form a conductive pattern, e.g., comprised of a conductive ink based on silver, carbon, etc., on a flexible substrate, e.g., polytethyline, polyvinyl chloride or other plastic type material. It should be understood that the term "printing" is intended to broadly connote any fabrication technique for forming, depositing or otherwise laying down a path of conductive material.

FIGS. 1 and 2 correspond to FIGS. 1 and 2 of U.S. Pat. No. 5,609,716 and depict an exemplary prior art identification device 10 comprising a flexible wristband 12 bearing identification information, typically visually readable bar code imprinted information 14. The device of FIGS. 1 and 2 is suitable for manufacture in a continuous line manufacturing process as depicted in FIG. 3. The use of bar code technology or other visually readable techniques is limited to those applications where it is practical to maintain line-of-sight between the identification device and a reader. In applications where line-of-sight cannot be maintained, it is useful to employ radio frequency technology, e.g., as discussed in U.S. Pat. No. 4,333,072.

The present invention is directed to radio frequency identification (RFID) tags suitable for use with wristbands and the like which can be manufactured using a continuous line process as is generally depicted in FIG. 3.

In a typical application, the RFID tag can be used to identify a person to permit, deny or otherwise determine the level of access to an area, e.g., a concert, a work area or other restricted environment or to convey descriptive information about a person, e.g., for hospital patient management.

Figure 4:
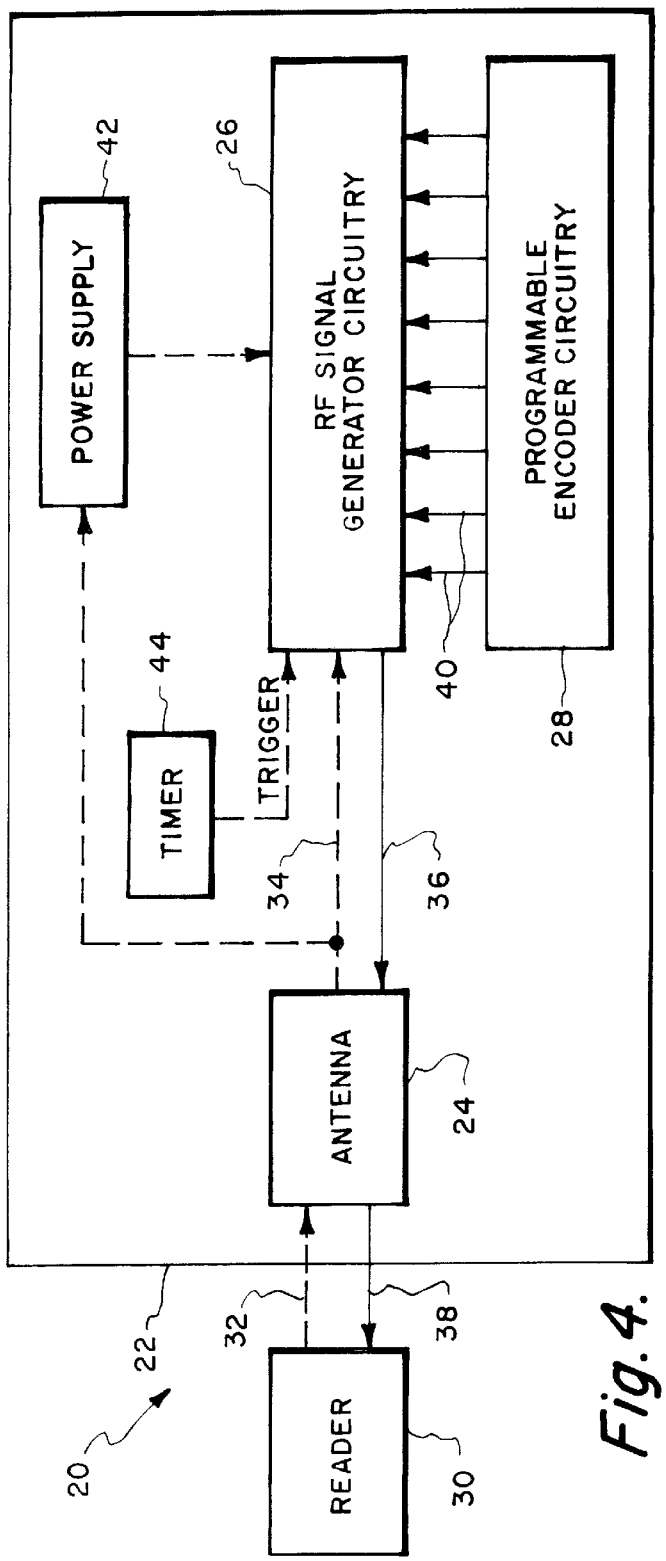
FIG. 4 shows a simplified block diagram of an identification tag in accordance with the present invention for producing a radio frequency signal bearing identification information.

FIG. 4 shows an exemplary tag 20 in accordance with the invention primarily comprised of (1) a flexible substrate 22, (2) antenna 24, (3) signal generator circuitry 26 carried by the flexible substrate 22 and (3) programmable encoder circuitry 28 formed on the flexible substrate 22. In a typical mode of operation, a reader 30 emits a radio frequency (RF) interrogation signal (typically between 100 KHz and 3 GHz) via path 32 which is received by the antenna 24. The received interrogation signal is coupled via path 34 to the signal generator circuitry 26 which generates a radio frequency identification signal bearing identification information defined by the encoder circuitry 28. The identification signal is applied to the antenna 24 via path 36 which transmits it back to the reader 30 via path 38.

The encoder circuitry 28 can be implemented in various manners in accordance with the invention to satisfy particular application requirements. For example, the circuitry 28 can function as a read-only memory programmed at the time of manufacture or alternatively as a read-write memory which is nonvolatile but alterable. A read-write capability is useful for writing in information into the tag subsequent to manufacture, for example, at the time the tag is issued to an individual. Various well known techniques can be used to write, i.e., alter, the memory to define identification information. Specific embodiments of the encoder circuitry 28 can, of course, also include both read-only memory portions as well as read-write memory portions.

In a typical read-only implementation, the encoder circuitry 28 can comprise a plurality of selectively formed electrical connections 40 to the signal generator circuitry 26 by forming electrical connections to the signal generator circuitry inputs, e.g., by printing conductive ink on the flexible substrate 22. Consequently, the operation, e.g., the timing, of the signal generator circuitry 26 is modified by the identification information defined by the encoder circuitry 28 to generate the identification signal. In an alternative implementation, the encoder circuitry 28 can include a semiconductor memory, e.g., a read-only device or a read-write device (either volatile or nonvolatile) such that data stored within the memory defines the identification information. Such a semiconductor memory can be configured to enable it to be remotely programmed, e.g., by a radio frequency command signal.

The signal generator circuitry 26 can be implemented as either active (power consuming, e.g., semiconductor switches and/or amplifiers) or passive (i.e., reflective) circuitry. For active implementations, a power supply 42, e.g., a battery, is used to supply power to the signal generator 26. Alternatively, the power supply 42 can extract power from the received RF signal (see U.S. Pat. No. 4,333,072 to Beigel).

In an alternative implementation of the signal generator, the signal generator 26 can emit a signal in response to a specific trigger event, e.g., an input from a timer 44 or sensor input in the tag. In such an implementation, the signal generator 26 generates the radio frequency signal bearing the identification information to the reader 30 via path 38 without requiring the interrogation signal on path 32.

The signal generator circuitry 26 is carried by, i.e., mounted proximate to or formed on, the substrate 22. In a preferred embodiment shown in FIG. 5, the signal generator circuitry 26 is implemented via printing techniques using conductive ink on the flexible substrate 22. In this embodiment, a delay line 50, coupled to antenna 24 (essentially an inductor), is selectively formed of a plurality of inductors (L) 52 and capacitors (C) 54. Conductive ink 55 is imprinted on the flexible substrate 22 to selectively enable portions of the circuit, i.e., capacitors 54 which form each LC portion of the delay line 50, which define the identification signal. While this embodiment shows signal generator circuitry 26 implemented from reactance elements, i.e., inductors and capacitors, which reflect a modified interrogation signal as the identification signal, it will be additionally described below how to implement active signal generator circuitry using similar printing techniques that instead emits an identification signal or reflects a modified interrogation signal based on varying the power absorption by the tag of the interrogation signal (see U.S. Pat. No. 4,333,072).

For example, using an exemplary half-duplex transmission protocol, only one portion of a tag/reader pair transmits a signal at a given time. For instance, the reader transmits an interrogation signal which is rectified and stored in a capacitor inside the tag. The reader then shuts off its signal and sets itself to receive incoming (low level) signals and the tag transmits its identification signal using the stored energy in the capacitor. The process repeats until successful reception of the identification signal by the reader. Alternatively, using an exemplary full-duplex transmission protocol, the reader and the tag are active simultaneously. The reader continuously transmits an energizing signal to the tag which is rectified and stored in a capacitor, typically smaller than that used in an exemplary half duplex tag. The tag transmits an identification signal by sequentially variably loading its antenna coil in a pattern corresponding to the identification code. The reader receives and interprets the identification signal during the transmission of the interrogation signal.

In operation, antenna 24 receives the electromagnetic signal via path 32 and passes this received signal via path 34 to the delay line 50. In response to the received signal on path 34, the delay line 50 reflects back a unique (dependent upon the enabled LC legs) identification signal to the antenna 24, detectable by the remote reader 30.

Figure 5:
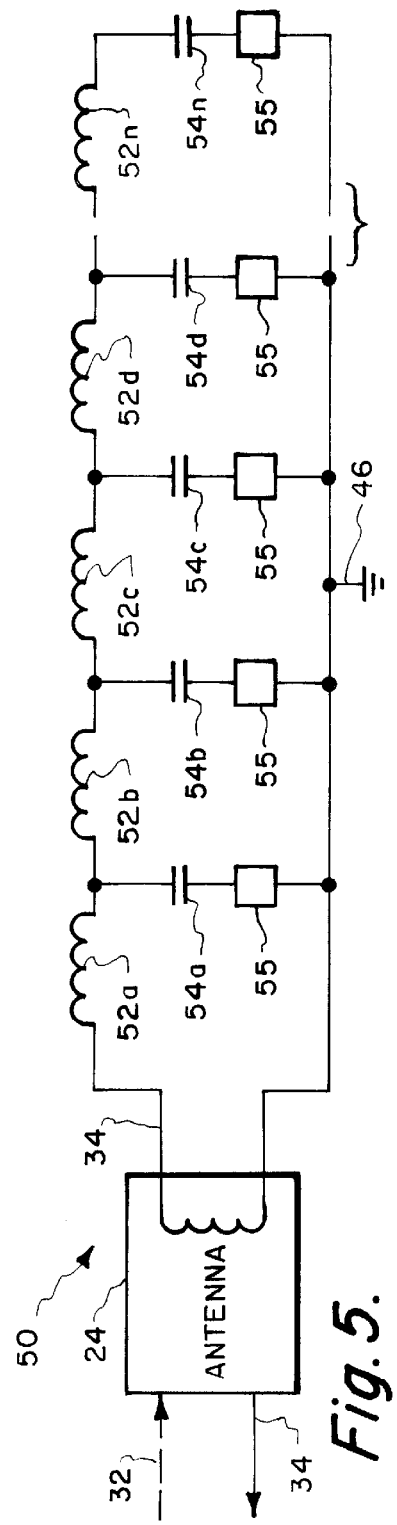
FIG. 5 is a circuit schematic diagram of a tag in accordance with the invention comprised of selectively enabled inductor-capacitor (LC) components, suitable for fabrication via printing techniques.
Figure 6A:
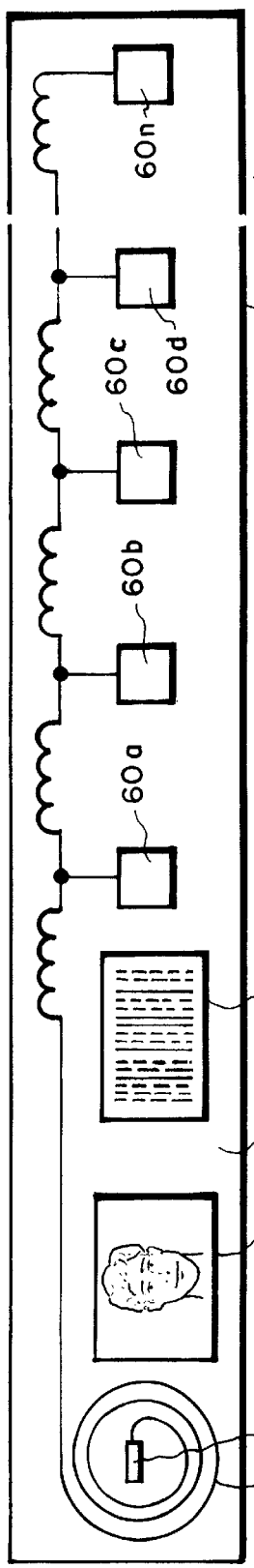
FIGS. 6A and 6B are respectively top and bottom views of printed portions of the passive tag of FIG. 5.
Figure 6B:
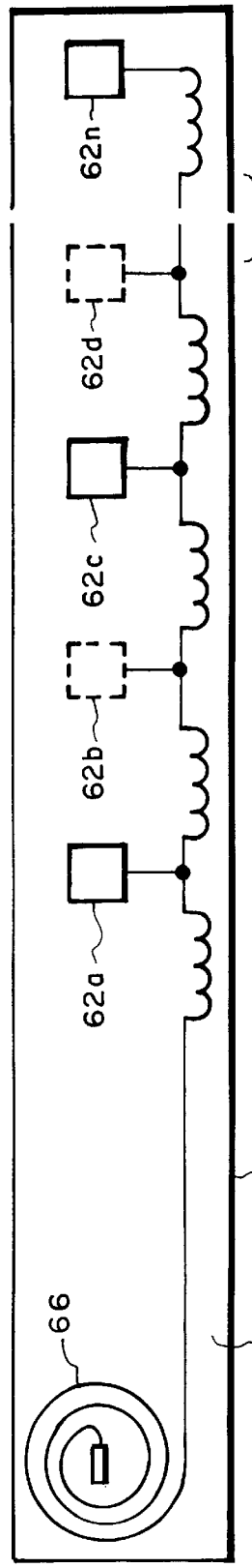

FIGS. 6A and 6B respectively show exemplary patterns suitable for etching on top 56 and bottom 58 sides of the flexible substrate 22 to form the circuitry of FIG. 5. The RFID circuitry, i.e., the encoder circuitry 28 and signal generator circuitry 26, is implemented by printing patterns on the flexible substrate 22 using conductive ink 55. For example, inductors 52 are formed by a preferably curved path printed on one side of the substrate 22 while capacitors 54 are implemented by printing a first conductive plate 60 on the top substrate side 56 and a second conductive plate 62 on the bottom substrate side 58, thus forming two conductive plates 60, 62 separated by a dielectric, i.e., the substrate 22.

By selectively printing/depositing second conductive plates 62 on the bottom substrate side 58, capacitors 54 can be selectively formed to change the reflection characteristics of the delay line 50, i.e., to form the encoder circuitry 28. For example in FIG. 6B, while the second conductive plate 62a is present and thus capacitor 54a exists, the second conductive plate 62b is absent and thus capacitor 54b is also absent. The antenna 24 is shown in FIG. 5 as a single inductor. However, the exemplary antenna 24 of FIG. 6 actually shows a pair of inductors 64 and 66 coupled by a centrally located capacitor 68. Alternatively, a feedthrough (not shown) can be drilled or punched through the substrate 22 and filled with conductive ink 55 to form a single inductor antenna 24 as shown in FIG. 5.

Optionally, visually identifiable data can also be printed on the substrate 22, e.g., a picture 70 and/or a bar-coded pattern 72. Alternatively, a conductive bar-coded pattern can be used to provide electrical connections to determine the identification signal, i.e., perform the function of the conductive ink 55, as well as providing a means to visually identify the tag. To protect and isolate the conductive patterns from electrical interaction with a tagged object, e.g., a person's wrist, additional layers of flexible material are preferably laminated to the top 56 and bottom 58 substrate sides (see FIG. 10).

In another preferred embodiment, a pattern of conductive, e.g., graphite based, semiconductive and insulating polymers can be printed or otherwise deposited on the flexible substrate 22 to form the signal generator 26 and/or the encoder circuitry 28 from a plurality of semiconductor switches and/or amplifiers, e.g., field effect transistors (FETs). An exemplary technique for forming such a device, referred to as an organic semiconductor, is described in an article by Garnier et al. entitled "All-Polymer Field-Effect Transistor Realized by Printing Techniques" (Science, Vol. 265, Sep. 16, 1994) which is incorporated herein by reference. Forming an RFID tag from active circuitry, e.g., FETs or other transistors, present significant advantages. For example, while the reflective circuitry shown in FIG. 5 is an effective circuit for unique detection by a reader 30, some limitations do exist. Typically, reflective circuitry will have a limited range and the characteristics of the reflected signal will be limited to the frequency range and time period of the electromagnetic interrogation signal on path 32. However, active circuitry can respond to the interrogation signal by emitting an identification signal having different frequency characteristics and/or the signal can be delayed a predetermined period of time from the received interrogation signal. Additionally, active circuitry can present a higher energy identification signal with a higher data content that is more identifiable by the reader 30.

Additional technologies are available for creating additional components as part of the RFID tag circuitry by using printing techniques on a flexible substrate. For example, a battery is described in an article by Davis entitled "Johns Hopkins Scientists Create All-Polymer Battery" (PCIM February 1997), LEDs, i.e., diodes, fabricated from organic semiconductors are also known in the art, and resistors can be implemented by using different compositions for lines of conductive ink printed on the substrate, restricting the printed line width or extending its length.

Figure 7:
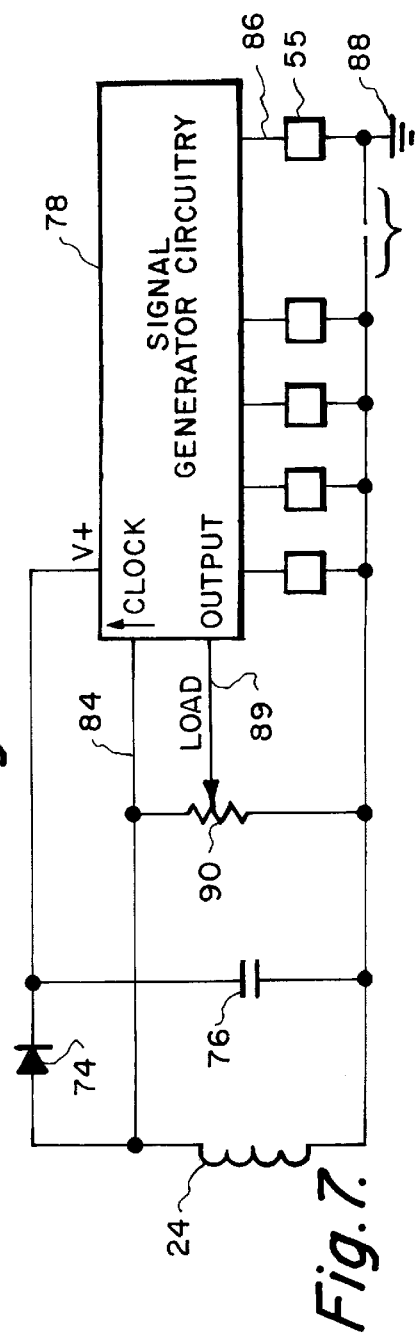
FIG. 7 is a circuit schematic diagram of tag circuitry, e.g., a sequential counter, comprised of semiconductor switches and/or amplifiers that are selectively enabled to emit a radio frequency signal bearing identification information.

FIG. 7 shows an exemplary implementation of an RFID tag using active circuitry (similar to that shown in U.S. Pat. No. 4,333,072) suitable for implementation by printing fabrication techniques on a flexible substrate. Essentially, antenna 24 receives an electromagnetic interrogation signal which is half-wave rectified by the combination of diode 74 and capacitor 76 to provide power (V+) to active signal generator circuitry 78, implemented as organic semiconductors (e.g., a plurality of semiconductor switches or amplifiers 80 used to form circuitry 78, e.g., a sequential counter as described in U.S. Pat. No. 4,333,072). Alternatively, a battery can power the signal generator circuitry 78. The interrogation signal 32 is coupled to the signal generator circuitry 78 via path 84 where it is used as a clock input. Dependent upon which inputs 86 are connected to ground 88 using pads of conductive ink 55 (thus comprising encoder circuitry), the signal generator circuitry 78 outputs an identification signal via path 89 that activates load circuit 90 (preferably comprised of a FET and an optional load resistor) in a predetermined sequence. This loading of the received signal can be remotely detected by the reader 30.

Figure 8A:
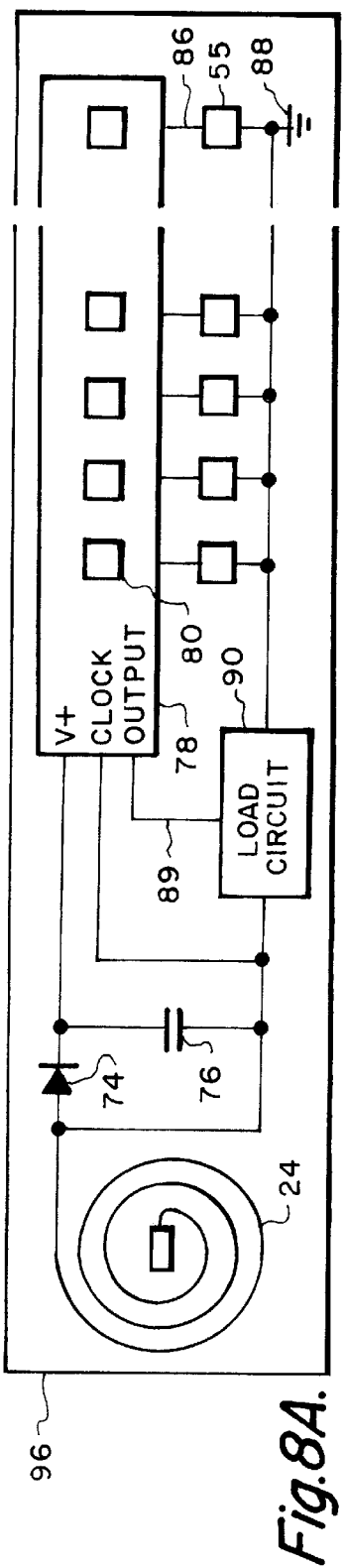
FIGS. 8A–8C respectively show the top and bottom sides of a middle flexible substrate layer and a top side of an upper laminate, collectively defining the circuitry of FIG. 7.
Figure 8B:
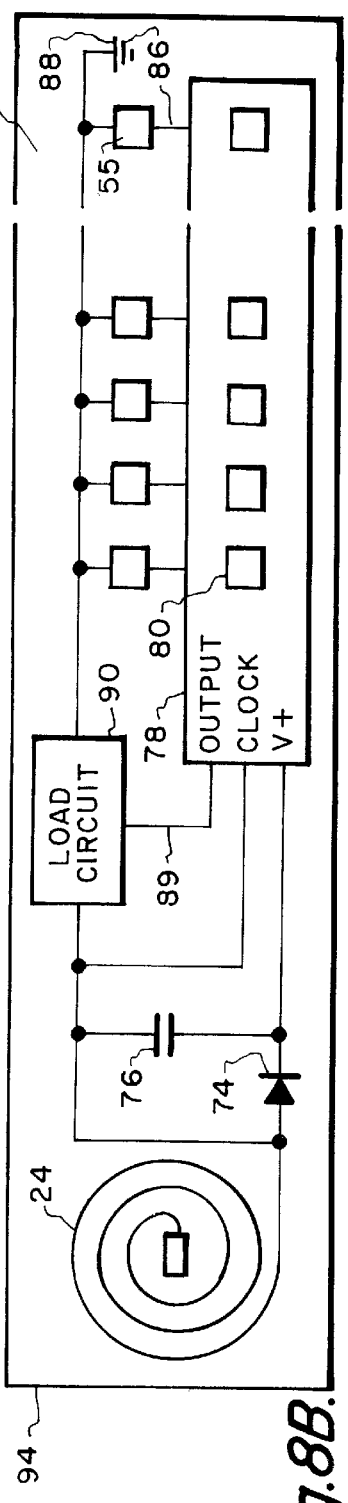
Figure 8C:
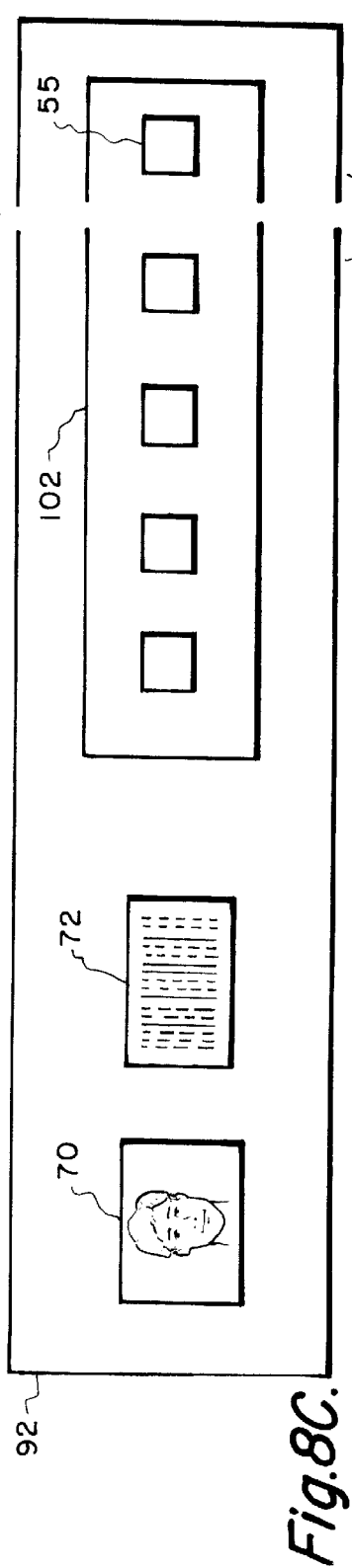
Figure 9:
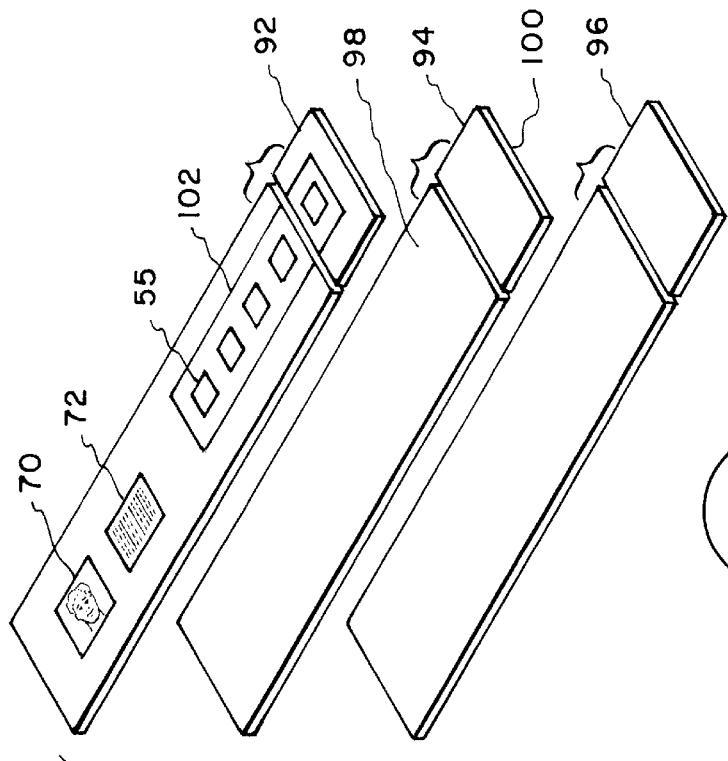
FIG. 9 shows a blow up view of three laminated layers of flexible substrate material which form the tag of FIG. 7.

FIGS. 8 and 9 show an exemplary implementation of the circuitry of FIG. 7 as a laminate of three flexible substrate layers 92, 94 and 96, having conductive, semiconductive and insulating polymers imprinted thereon to form organic semiconductors, capacitors and inductors. A middle flexible substrate layer 94 has polymer patterns printed on its top 98 and bottom 100 surfaces. The inductors and capacitors are formed as previously described in reference to FIG. 6 while the load circuit 90 and the signal generator circuitry 78 are formed as organic semiconductors as described by Garnier et al. Pads between inputs 86 to the signal generator circuitry 78 and ground 88 are left open on the top surface of the middle substrate layer 94. To protect the deposited circuitry, a top substrate layer 92 is laminated above the middle substrate layer 94 and a bottom substrate layer 96 is laminated below (see also FIG. 10). However, the top substrate layer 92 additionally has a window 102 corresponding to the position of the input 86 and ground 88 pads. Consequently, conductive ink 55 can be printed or otherwise deposited through the window 102 to programmably encode the signal generator circuitry 78, i.e., defining the encoder circuitry 28. Typically inputs 86 are high impedance inputs, e.g., when the signal generator circuitry 78 is FET based. Thus, the choices for the conductive ink 55 are greatly expanded, i.e., a large resistivity range of inks are acceptable.

Such a tag structure is suitable for continuous line manufacturing. Alternatively, such a tag can be formed in discrete steps. For example, the three layer laminate comprised of layers 92, 94 and 96 can be formed first including the depositions associated with the middle substrate layer 94 and at a later time and/or location, e.g., where the tags are distributed, the tag can be programmably encoded through the window 102.

Figure 10:
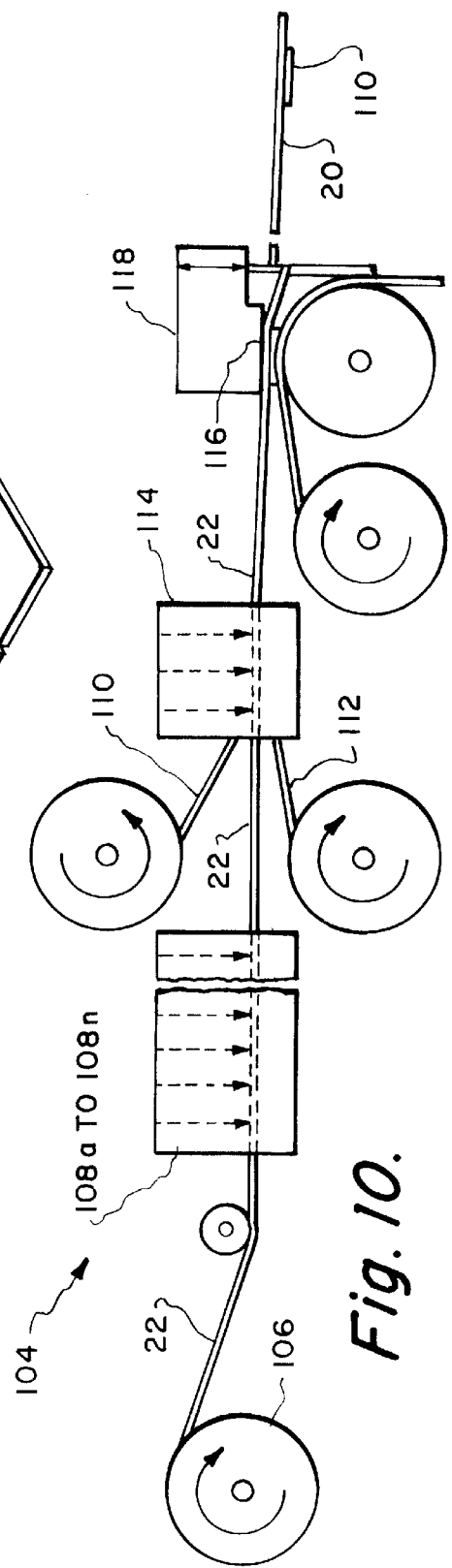
FIG. 10 shows a schematic of an apparatus (a modification of that shown in FIG. 3) for continuous line manufacturing the preferred tags of FIGS. 5–9.

FIG. 10 shows a schematic of an exemplary apparatus 104 (a modification of that shown in FIG. 3) for manufacturing the preferred tags 20 of FIGS. 4–8. In operation, the flexible substrate 22 is dispensed from roll 106 and fed past a plurality of process stations 108a–n which imprint the conductive, semiconductive and insulating patterns required to add connections and/or define circuitry which comprise the RFID tag circuitry as described above. The process stations 108 perform various functions, depending on the process, e.g., to imprint various conductive, semiconductive and insulating ink layers, to dry the ink, etc. After imprinting, additional layers of flexible materials 110, 112 are preferably laminated using laminating station 114 to the substrate 22. Fastening means 116 are then preferably attached to or formed on the substrate 22 and the substrate 22 is cut using cutting means 118 to form the completed identification tag 20. Such apparatus 104, can operate either upon demand, i.e., when a new tag is required, or at an essentially continuous rate for continuous line manufacturing of a plurality of uniquely identifiable tags 20. Alternatively, the tag can be manufactured at the factory but not fully programmed. The partially programmed tags can be shipped in continuous rolls to deployment locations where a separate programming fixture (not shown) can complete the tag programming upon demand, e.g., by depositing conductive ink pattern as previously described and/or other visual identifying information.

Although the present invention has been described in detail with reference only to the presently-preferred embodiments, those of ordinary skill in the art will appreciate that various modifications can be made without departing from the invention.

I claim:

1. An identification tag for producing a radio frequency identification signal, said tag comprising:
   a flexible substrate;
   programmable encoder circuitry formed on said substrate for defining identification information;
   an antenna; and
   signal generator circuitry carried by said substrate responsive to said encoder circuitry for applying a radio frequency signal bearing said identification information to said antenna.

2. The identification tag of claim 1 wherein said signal generator circuitry includes at least one semiconductor device formed by deposition on said substrate.

3. The identification tag of claim 2 wherein said semiconductor device within said signal generator circuitry is formed of polymer materials deposited on said substrate.

4. The identification tag of claim 1 wherein said signal generator circuitry includes reactance elements formed by deposition on said substrate.

5. The identification tag of claim 1 wherein said encoder circuitry includes a plurality of conductive paths selectively formed on said substrate for defining said identification information.

6. The identification tag of claim 5 wherein said encoder circuitry includes a plurality of conductive paths selectively deposited on said substrate to define said identification information.

7. The identification tag of claim 1 wherein said encoder circuitry includes at least one semiconductor device formed by deposition on said substrate.

8. The identification tag of claim 7 wherein said semiconductor device within said encoder circuitry is formed of polymer materials deposited on said substrate.

9. The identification tag of claim 1 wherein said antenna is formed by depositing a conductive path on said substrate.

10. A system for providing identification information, said system comprising:
    a reader for emitting an electromagnetic signal;
    a tag responsive to said electromagnetic signal for producing an identification signal in response thereto, said tag comprising:
      a flexible substrate;
      an antenna for receiving said electromagnetic signal mounted on said flexible substrate;
      circuitry coupled to said antenna for generating said signal in response to said electromagnetic signal received by said antenna; and
      a first pattern of conductive ink printed on said flexible substrate defining at least one of a plurality of selectable electrical connections coupled to said circuitry for defining said identification signal; and
    wherein said reader is responsive to said identification signal.

11. The identification tag of claim 10 wherein said circuitry is defined by a second conductive ink pattern and wherein said second conductive ink pattern defines a plurality of selectively enabled reactance elements which define said identification signal.

12. The identification tag of claim 10 wherein said circuitry comprises a semiconductor chip and wherein said first conductive ink pattern selectively enables one or more of a plurality of inputs to said circuitry to define said identification signal.

13. The identification tag of claim 10 wherein said circuitry includes a second conductive ink pattern and wherein said second conductive ink pattern defines a plurality of semiconductor devices on said flexible substrate, wherein said first conductive ink pattern selectively enables one or more of a plurality of inputs to said circuitry to define said identification signal.

14. A method of forming an identification tag for producing a radio frequency identification signal, said method comprising the steps:
    dispensing a continuous strip of flexible substrate from a dispensing assembly;
    depositing a first pattern of conductive ink on said flexible substrate to form an antenna;
    depositing a second pattern of conductive ink on said flexible substrate to form signal generator circuitry for applying said radio frequency identification signal bearing identification information to said antenna; and
    separating a portion of said flexible substrate including said deposited first and second patterns to define said identification tag.

15. The method of claim 14 wherein said second pattern of conductive ink defines a plurality of semiconductor devices.

16. The method of claim 14 wherein said second pattern of conductive ink defines reactance elements.

17. The method of claim 14 additionally comprising the step of selectively depositing a third pattern of conductive ink on said flexible substrate to programmably define said identification information.

18. The method of claim 14 additionally comprising the step of placing attachment means on said separated portion of said flexible substrate.

19. The method of claim 14 additionally comprising the step of depositing a third pattern of conductive ink on said flexible substrate for determining the radio frequency identification signal produced by said signal generator circuitry.

20. The method of claim 19 wherein said step of depositing a third pattern of conductive ink additionally defines a visually identifiable pattern.

* * * * *

(12) EX PARTE REEXAMINATION CERTIFICATE (7991st)
United States Patent
Beigel

(10) Number: US 5,973,598 C1
(45) Certificate Issued: Jan. 18, 2011

(54) RADIO FREQUENCY IDENTIFICATION TAG ON FLEXIBLE SUBSTRATE

(75) Inventor: Michael L. Beigel, Corona, CA (US)

(73) Assignee: Wells Fargo Bank, National Association, Woodland Hills, CA (US)

Reexamination Request:
No. 90/009,549, Sep. 25, 2009

Reexamination Certificate for:
Patent No.: 5,973,598
Issued: Oct. 26, 1999
Appl. No.: 09/150,130
Filed: Sep. 9, 1998

(51) Int. Cl.
*G07C 9/00* (2006.01)
*G08B 13/24* (2006.01)
*G06K 19/077* (2006.01)
*G06K 19/07* (2006.01)

(52) U.S. Cl. .............. 340/572.1; 29/595; 29/846; 29/DIG. 40; 340/572.5; 340/572.9

(58) Field of Classification Search ............ None
See application file for complete search history.

(56) References Cited

U.S. PATENT DOCUMENTS

| | | | | |
|---|---|---|---|---|
| 4,333,072 A | * | 6/1982 | Beigel | 340/10.34 |
| 4,857,893 A | * | 8/1989 | Carroll | 340/572.7 |
| 5,345,231 A | * | 9/1994 | Koo et al. | 340/870.31 |
| 5,381,137 A | | 1/1995 | Ghaem et al. | |
| 5,446,447 A | | 8/1995 | Carney et al. | |
| 5,448,110 A | | 9/1995 | Tuttle et al. | |
| 5,512,879 A | | 4/1996 | Stokes | |
| 5,609,716 A | * | 3/1997 | Mosher, Jr. | 156/522 |
| 6,104,311 A | * | 8/2000 | Lastinger | 340/10.51 |

OTHER PUBLICATIONS

Garnier, Hajlaui, Yassar & Srivastava ("Garnier"), "All–Polymer Field–Effect Transistor Realized by Printing Techniques," *Science*, Sep. 16, 1994, pp. 1684–1686.

Horowitz and Hill ("Horowitz"), The Art of Electronics, Cambridge University Press, 1985 printing, p. 38.

* cited by examiner

*Primary Examiner*—Eric B Kiss

(57) ABSTRACT

An enhanced identification tag produces an identification (ID) signal, i.e., a radio frequency (RF) signal carrying identification information, capable of being interpreted by an electronic reader device. An identification tag in accordance with the invention is characterized by a flexible substrate, programmable encoder circuitry formed on said substrate defining identification information, an antenna, and signal generator circuitry carried by said substrate responsive to said encoder circuitry for applying a radio frequency signal bearing said identification information to said antenna. A preferred tag is fabricated using a printing process to mark a conductive pattern, e.g., comprised of a conductive ink based on silver, carbon, etc., on a flexible substrate, e.g., polyethyline, polyvinyl chloride or other plastic type material. In a typical application, the flexible substrate is then preferably used to form a wrist band that can be used to identify an individual to permit, deny or otherwise determine the level of access to an area, e.g., a concert, a work area or other restricted environment.

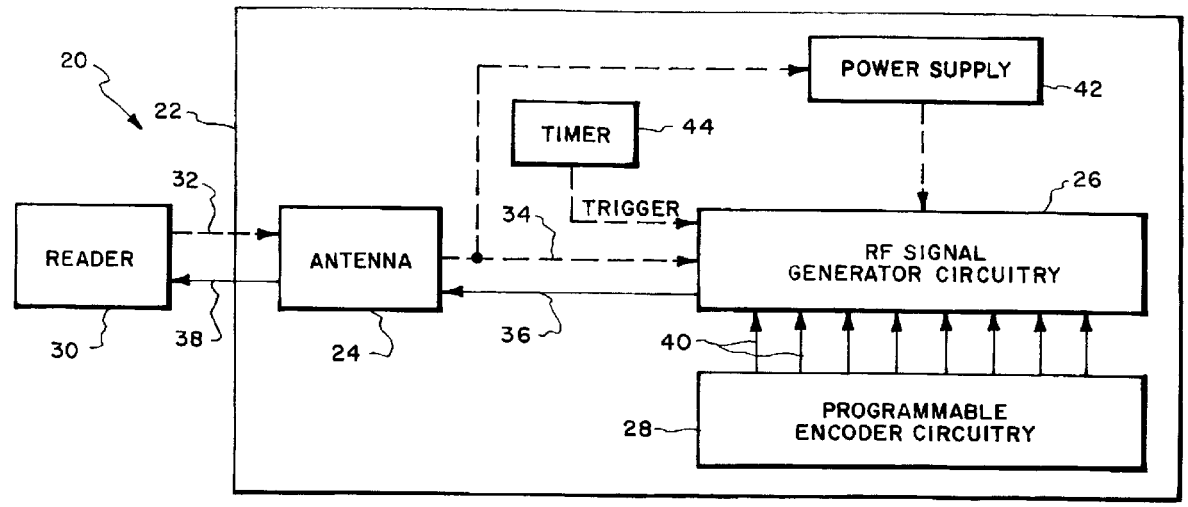

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *